| United States Patent [19] | [11] Patent Number: 5,055,358 |
|---|---|
| Livingston et al. | [45] Date of Patent: Oct. 8, 1991 |

[54] LOW REFLECTANCE FILMS FOR TRANSPARENT SUBSTRATES

[75] Inventors: Robert L. Livingston, Monclova; Gary A. Smith, Maumee, both of Ohio

[73] Assignee: Libbey-Owens-Ford Co., Toledo, Ohio

[21] Appl. No.: 414,697

[22] Filed: Sep. 29, 1989

[51] Int. Cl.$^5$ ............................................. B32B 17/06
[52] U.S. Cl. ..................... 428/433; 428/216; 428/336; 428/426; 428/432; 428/469; 428/472; 428/697; 428/701; 359/359; 359/360; 359/580; 359/589
[58] Field of Search ................. 350/1.6, 1.7, 166, 164; 428/216, 212, 426, 432, 433, 457, 469, 472, 688, 689, 697, 701, 702, 336

[56] References Cited

U.S. PATENT DOCUMENTS

| 3,826,728 | 7/1974 | Chambers et al. | 428/433 |
|---|---|---|---|
| 3,846,152 | 11/1974 | Franz | 350/1.7 |
| 3,990,784 | 11/1976 | Gelber | 350/166 |
| 4,022,947 | 5/1977 | Grubb et al. | 428/432 |
| 4,045,125 | 8/1977 | Farges | 350/166 |
| 4,101,200 | 7/1978 | Daxinger | 428/215 |
| 4,122,239 | 10/1978 | Riboulet et al. | 428/621 |
| 4,139,443 | 2/1979 | Sakurai | 428/433 |
| 4,358,507 | 11/1982 | Senaha et al. | 428/472 |
| 4,448,855 | 5/1984 | Senaha et al. | 428/433 |
| 4,537,798 | 8/1985 | Cohen | 427/166 |
| 4,702,955 | 10/1987 | Allied et al. | 350/1.7 |
| 4,715,879 | 12/1987 | Schmitte et al. | 65/60.2 |
| 4,769,291 | 9/1988 | Belkind et al. | 428/34 |
| 4,847,158 | 7/1989 | Gillery | 428/433 |
| 4,868,004 | 9/1989 | Zültzke et al. | 427/42 |

Primary Examiner—Ellis P. Robinson
Assistant Examiner—Archene A. Turner
Attorney, Agent, or Firm—Marshall & Melhorn

[57] ABSTRACT

A transparent substrate is coated with consecutive layers of chromium, chromium oxides, and a metal oxide, thereby producing a transparent article having low visible light transmittance and low film side reflectance, which is particularly useful as an automotive or architectural solar control glazing.

28 Claims, No Drawings

LOW REFLECTANCE FILMS FOR TRANSPARENT SUBSTRATES

FIELD OF THE INVENTION

The present invention relates generally to low reflectance films for transparent substrates, and more specifically, to a low reflectance composite film for automotive and architectural glazings.

BACKGROUND OF THE INVENTION

The glass industry has developed several products for use as automotive and architectural glazings, having low transmittance values in order to admit some light but exclude much of the solar energy from the interior of the automobile or building. One method for producing such products has been to include large quantities of iron in the glass, thereby producing a bluish-green glass which absorbs infrared energy and ultraviolet radiation. An alternative method of producing a product having low transmittance has been to coat glass or plastic substrates with metallic or metallic oxide layers, which absorb or reflect certain wavelengths of solar radiation. Such coatings may be deposited by several well known methods, including such as for example thermal evaporation, chemical vapor deposition, sputtering, etc. A particularly useful method for applying solar control films to transparent substrates is disclosed in U.S. Pat. No. 3,673,981 to Beckham et al.

A major disadvantage inherent in the coated transparent substrates of the prior art is the high film side reflectance resulting from the deposited film layers. In particular, automobile manufacturers require the lowest possible interior film side reflectance, especially for curved automotive solar control glazings, in order to minimize their so called "funhouse mirror" effect. The coated glass panels heretofore known in the art as useful for solar control windows in vehicles have typically exhibited visible light transmittance values in the range of about 10%, and film side reflectance values of at least 35%.

U.S. Pat. No. 3,826,728 discloses a transparent glass panel coated with consecutive layers of nickel or a nickel-based alloy, sputter coated to a thickness from 50 to 400 Angstroms, and a protective metal oxide such as silicon dioxide having a thickness from 1,000 to 100,000 Angstroms. The disclosed coating reduces infrared energy transmittance, and therefore total solar energy transmittance, but allows the transmittance of some visible light. Also disclosed is a single 80 Angstroms thick coating of chromium on one-eighth thick window glass. The patent suggests that chromium is an undesirable coating material, because it allows increased transmittance of infrared energy at increasing wavelengths.

U.S. Pat. No. 4,022,947 discloses a transparent panel, which allows visible light transmittance from 6% to 20%, and exhibits a film side reflectance from 42% to 60%. The transparent panel comprises consecutively a transparent substrate such as glass, a 30 to 600 Angstrom thick sputtered metal film containing predominantly iron, nickel, and chromium, and a 100 to 3,000 Angstrom thick sputtered protective overcoat of an oxide of a metal mixture or alloy containing predominantly iron, nickel, and chromium. Such a transparent panel would not be desirable as a solar control vehicle window, however, because film side reflectance values are 42% or greater.

It would be desirable to produce a transparent panel, for use as an automotive or architectural solar control glazing, having a visible light transmittance less than 10% and a film side reflectance less than 30%.

It must be noted that the prior art referred to hereinabove has been collected and examined only in light of the present invention as a guide. It is not to be inferred that such diverse art would otherwise be assembled absent the motivation provided by the present invention.

SUMMARY OF THE INVENTION

Accordant with the present invention, a coated transparent substrate having low visible light transmittance and low film side reflectance has surprisingly been discovered, comprising:

A) a transparent substrate, having a surface;
B) a coating of chromium deposited on and adhered to the surface of the transparent substrate;
C) a coating of chromium oxides deposited on and adhered to the coating of chromium; and
D) a coating of a metal oxide deposited on and adhered to the coating of chromium oxides.

The coated transparent substrates of the present invention are characterized by low visible light transmittance and low reflectance from both the coated and non-coated (glass) sides, thereby making them particularly useful for automotive and architectural solar control glazings.

DETAILED DESCRIPTION OF THE PREFERRED EMBODIMENT

Suitable transparent substrates useful for practicing the present invention are those having superior structural properties and minimal absorption characteristics in the visible light spectral region. Such transparent substrates include, but are not limited to, glass, such as for example soda-lime silica glass produced by the well known float glass process, fused silica, and plastics, such as for example polycarbonates, polymethylmethacrylate, and the like. A preferred transparent substrate is glass. Furthermore, the transparent substrates may possess a color tint such as grey, green, blue-green, bronze, etc. A particularly preferred transparent substrate is grey glass.

The sequential coatings of chromium, chromium oxides, and a metal oxide, which are deposited upon a surface of the transparent substrate according to the present invention, may be applied by any of several well known techniques, such as for example thermal evaporation, sputtering, chemical vapor deposition, etc. A preferred method is thermal evaporation, wherein a material to be deposited is heated to its vaporization or sublimation temperature at a location near the substrate. The material thereafter condenses or desublimes onto an exposed surface of the substrate, or onto a previously applied coating layer. A thermal evaporation coating device which is particularly useful for practicing the present invention is more fully set forth in U.S. Pat. No. 3,673,981 to Beckham et al., which is hereby incorporated herein in its entirety by reference thereto.

The chromium coating, which is adhered directly to a surface of the transparent substrate, may be deposited by thermally evaporating chromium metal in a crucible near the glass substrate. A layer of chromium metal thereby deposits onto and adheres to the transparent substrate. The chromium coating thickness may vary over a wide range, depending upon the transmittance and reflectance properties desired for the ultimately produced article. The chromium coating thickness may vary from about 10 Angstroms to about 1,000 Angstroms. Preferably, the thickness is about 50 Angstroms to about 200 Angstroms. A particularly preferred thickness is about 100 Angstroms.

The chromium oxides coating, which is adhered to the exposed surface of the previously applied chromium layer, may be deposited by thermally evaporating chromium metal in a crucible, in the presence of an oxidizer. The chromium oxides molecules thus produced deposit onto and adhere to the layer of chromium metal. By the term "chromium oxides" as used herein is meant a non-stoichiometric mixture of oxides of chromium. Oxidizers known in the art, such as for example oxygen, air, water vapor, various oxides of nitrogen, and the like, may be used, including mixtures thereof. A preferred oxidizer is oxygen. The thickness of the chromium oxides coating may vary over a wide range, again depending upon the transmittance and reflectance properties desired for the finished coated substrate. The chromium oxides layer may vary from about 25 Angstroms to about 1,500 Angstroms. Preferably, the thickness is about 75 Angstroms to about 350 Angstroms. A particularly preferred thickness is about 175 Angstroms.

The final coating of a metal oxide provides a durable protective coating for the chromium oxides layer. The metal oxide may be applied by thermal evaporation, and thereby deposited directly onto the exposed surface of the chromium oxides layer. Useful metal oxides suitable for practicing the present invention include, but are not limited to, oxides of silicon, tin, titanium, aluminum, nickel, zinc, vanadium, tungsten, and tantalum, as well as mixtures thereof. A preferred metal oxide is silicon dioxide. The term "silicon dioxide" as used herein contemplates $SiO_2$, and other oxides of silicon having ratios of silicon and oxygen very near stoichiometric $SiO_2$, as well as mixtures thereof. The metal oxide may be deposited at any thickness generally known in the art as useful for providing a durable protective layer for coated transparent substrates. The thickness may therefore vary over a wide range from about 10 Angstroms to about 10,000 Angstroms. Preferably, the thickness is about 100 Angstroms to about 500 Angstroms. A particularly preferred thickness is about 250 Angstroms.

A suitable method for depositing the low reflectance films of the present invention includes monitoring the transmittance of the article during the coating process. Conveniently, the chromium layer is deposited onto the transparent substrate until a reduction in visible light transmittance to less than about 20% is achieved. Thereafter, the chromium oxides layer is deposited onto the chromium layer until a reduction in visible light transmittance to less than about 15% is achieved. The final silicon dioxide layer does not substantially alter the visible light transmittance properties of the coated substrate.

The resultant coated transparent substrate may exhibit a characteristic color or appear neutral when viewed by transmitted or reflected light. Because of optical interference phenomena, different colors may result depending on the thicknesses of the various coating layers. Generally, a neutral grey color is desirable for automotive solar control glazings, while neutral, blue, green, or bronze colored solar control glazings are desirable for architectural glazings as they may be coordinated so as to complement the color of a particular building.

The coated substrates of the present invention generally are produced so as to have a visible light transmittance value less than about 15%. Preferably, the visible light transmittance is less than about 10%.

The particular coating layers of the present invention provide a film side reflectance less than about 30%. Preferably, the film side reflectance is less than about 25%. This feature makes the coated transparent substrates of the present invention particularly suited for use as solar control windows in vehicles where the reflectance of the interior film side surface of the window must be kept to a minimum for aesthetic and safety reasons.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

EXAMPLE

Samples of colorless (clear) soda-lime-silica glass are coated according to the present invention. Twelve samples are prepared, each having approximately the following coating thicknesses.

chromium = 100 Angstroms
chromium oxides = 175 Angstroms
silicon dioxide = 250 Angstroms The visible light transmittance, film side reflectance, non-coated side reflectance, and CIELAB color parameters for transmitted and reflected light are measured.

The color compatibility, which results from a unique combination of layer compositions and thicknesses, is best defined by reference to the CIELAB color scale system. Thus, the CIE (Commission of Internationale de l'Eclairage) established several illuminants of known spectral distributions as standards for use in color measurements. Tristimulus colorimetry is based upon the fact that any color can be reproduced by three other colors of controlled amounts. Tristimulus color scales include the X, Y, Z system which represents the ratios of the integrals of light reflected from a sample being measured to the integrals of light reflected from a perfect diffuser, when both are multiplied wavelength by wavelength by the response curve of the Standard Observer and the Illuminant "C". The 1931 CIE Standard Observer response curves define the amount of each of three primary lights (green, amber and blue) needed to reproduce energy of each wavelength from 380 nm to 750 nm wherein the green curve is the standard luminosity curve for the human eye (x is amber, y is green, and z is blue).

The L, a, b tristimulus system has gained wide acceptance in recent years. L represents the mathematical approximation of the non-linear black-white response of the eye. A perfect white has a value of one hundred and a perfect black has a value of zero. The values of "a" and "b" identify the hue and chroma or color of the sample. A plus value of "a" indicates redness and a minus value indicates greenness. A plus value for "b" indicates yellowness and a minus value indicates blueness. The 1976 CIE L*, a*, b* scale, or CIELAB scale, has the following relationship with the CIE x, y, z scale:

$$L^* = 116(Y/Y_o)^{\frac{1}{3}} - 16$$

$$a^* = 500((X/X_o)^{\frac{1}{3}} - (Y/Y_o)^{\frac{1}{3}})$$

$$b^* = 200((Y/Y_o)^{\frac{1}{3}} - (Z/Z_o)^{\frac{1}{3}})$$

where $X/X_o$, $Y/Y_o$ and $Z/Z_o$ are each greater than 0.01 and $X_o$, $Y_o$, $Z_o$ define the color of the nominally white object-color stimulus.

Following are the average values for the twelve samples:

| | |
|---|---|
| visible light transmittance | 7.8% |
| film side reflectance | 22.6% |
| glass side reflectance | 14.8% |
| transmitted color | |
| L* | 33.2 |
| a* | 2.5 |
| b* | 10.4 |
| film side reflected color | |
| L* | 54.5 |
| a* | 2.6 |
| b* | 1.8 |
| glass side reflected color | |
| L* | 45.3 |
| a* | 1.7 |
| b* | 1.5 |

What is claimed is:

1. A coated, transparent article, comprising:
A) a transparent substrate, having a first, coated side and a non-coated side;
B) a coating of chromium deposited on and adhered to the first side of the transparent substrate;
C) a coating of chromium oxides deposited on and adhered to the coating of chromium; and
D) a coating of a metal oxide deposited on and adhered to the coating of chromium oxides;
wherein the visible light transmittance of the coated, transparent article is less than about 15%, and the coated side reflectance of the coated, transparent article less than about 30%.

2. The coated, transparent article according to claim 1, wherein the transparent substrate is glass.

3. The coated, transparent article according to claim 1, wherein the thickness of the chromium layer is about 10 Angstroms to about 1,000 Angstroms.

4. The coated, transparent article according to claim 3, wherein the thickness of the chromium layer is about 50 Angstroms to about 200 Angstroms.

5. The coated, transparent article according to claim 4, wherein the thickness of the chromium layer is about 100 Angstroms.

6. The coated, transparent article according to claim 1, wherein the thickness of the chromium oxides layer is about 25 Angstroms to about 1,500 Angstroms.

7. The coated, transparent article according to claim 6, wherein the thickness of the chromium oxides layer is about 75 Angstroms to about 350 Angstroms.

8. The coated, transparent article according to claim 7, wherein the thickness of the chromium oxides layer is about 175 Angstroms.

9. The coated, transparent article according to claim 1, wherein the metal oxide is selected from the group consisting of the oxides of silicon, tin, titanium, aluminum, nickel, zinc, vanadium, tungsten, tantalum, and mixtures thereof.

10. The coated, transparent article according to claim 9, wherein the metal oxide is silicon dioxide.

11. The coated, transparent article according to claim 1, wherein the thickness of the metal oxide layer is about 10 Angstroms to about 10,000 Angstroms.

12. The coated, transparent article according to claim 11, wherein the thickness of the metal oxide layer is about 100 Angstroms to about 500 Angstroms.

13. The coated, transparent article according to claim 12, wherein the thickness of the metal oxide layer is about 250 Angstroms.

14. The coated, transparent article according to claim 1, wherein the visible light transmittance is less than about 10%.

15. The coated, transparent article according to claim 1, wherein the coated side reflectance is less than about 25%.

16. The coated, transparent article according to claim 1, wherein the reflectance from the non-coated side of the article is less than about 17%.

17. A coated, transparent article, comprising:
A) a transparent substrate, having a first, coated side and a non-coated side;
B) a coating of chromium, deposited on and adhered to the first side of the transparent substrate, having a thickness from about 50 Angstroms to about 200 Angstroms;
C) a coating of chromium oxides, deposited on and adhered to the chromium coating, having a thickness from about 75 Angstroms to about 350 Angstroms; and
D) a coating of a metal oxide, selected from the group consisting of oxides of silicon, tin, titanium, aluminum, nickel, zinc, vanadium, tungsten, tantalum, and mixtures thereof, deposited on and adhered to the coating of chromium oxides, having a thickness from about 100 Angstroms to about 500 Angstroms;
wherein the visible light transmittance of the coated, transparent article is less than about 10%, and the coated side reflectance of the coated, transparent article is less than about 25%.

18. The coated, transparent article according to claim 17, wherein the transparent substrate is glass.

19. The coated, transparent article according to claim 17, wherein the thickness of the chromium layer is about 100 Angstroms.

20. The coated, transparent article according to claim 17, wherein the thickness of the chromium oxides layer is about 175 Angstroms.

21. The coated, transparent article according to claim 17, wherein the metal oxide is silicon dioxide.

22. The coated, transparent article according to claim 17, wherein the thickness of the metal oxide is about 250 Angstroms.

23. The coated, transparent article according to claim 17, wherein the reflectance from the non-coated side of the article is less than about 17%.

24. A coated, transparent article, comprising:
A) a glass substrate, having a first, coated side and a non-coated side;
B) a coating of chromium, deposited on and adhered to the first surface of the transparent substrate, having a thickness of about 100 Angstroms;
C) a coating of chromium oxides deposited on and adhered to the coating of chromium, having a thickness of about 175 Angstroms; and
D) a coating of silicon dioxide, deposited on and adhered to the coating of chromium oxides, having a thickness of about 250 Angstroms;
wherein the visible light transmittance of the coated, transparent article is less than about 10%, and the coated side reflectance of the coated, transparent article is less than about 25%.

25. The coated, transparent article according to claim 24, wherein the reflectance from the non-coated side of the article is less than about 17%.

26. A glazing, as defined in claim 1.
27. A glazing, as defined in claim 17.
28. A glazing, as defined in claim 24.

* * * * *

UNITED STATES PATENT AND TRADEMARK OFFICE
CERTIFICATE OF CORRECTION

PATENT NO. : 5,055,358

DATED : October 8, 1991

INVENTOR(S) : Robert L. Livingston and Gary A. Smith

It is certified that error appears in the above-identified patent and that said Letters Patent is hereby corrected as shown below:

Column 3, line 23, "1.500" should read --1,500--;
line 43, "10.000" should read --10,000--.

In the claims:
Column 5, claim 3, line 43, "1.000" should read --1,000--.

Signed and Sealed this

Twenty-third Day of March, 1993

*Attest:*

STEPHEN G. KUNIN

*Attesting Officer*     *Acting Commissioner of Patents and Trademarks*